No. 845,086. PATENTED FEB. 26, 1907.
T. HOERHOLD.
ADJUSTABLE HANDLE FOR SWEEP STOCKS AND THE LIKE.
APPLICATION FILED NOV. 8, 1906.

Witnesses
F. L. Ousand
E. Mutange

Inventor
Theodore Hoerhold,
By John A. Saul.
Attorney

UNITED STATES PATENT OFFICE.

THEODORE HOERHOLD, OF LEVINGTON, TEXAS.

ADJUSTABLE HANDLE FOR SWEEP-STOCKS AND THE LIKE.

No. 845,086.     Specification of Letters Patent.     Patented Feb. 26, 1907.

Application filed November 8, 1906. Serial No. 342,513.

*To all whom it may concern:*

Be it known that I, THEODORE HOERHOLD, a citizen of the United States, residing at Levington, in the county of Lee and State of Texas, have invented certain new and useful Improvements in Adjustable Handles for Sweep-Stocks and the Like, of which the following is a specification.

My invention relates to an adjusting device for the handles of plows, sweep-stocks, cultivators, and the like, and has for its object to so construct the same that by the simple manipulation of the bolt connecting the handles to a beam or the like said handles may be raised or lowered to any extent desired and locked in said adjusted positions.

Figure 1:
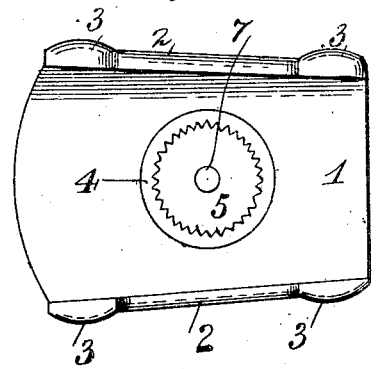
Figure 2:
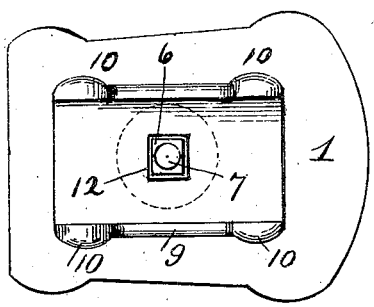
Figures 3, 4:
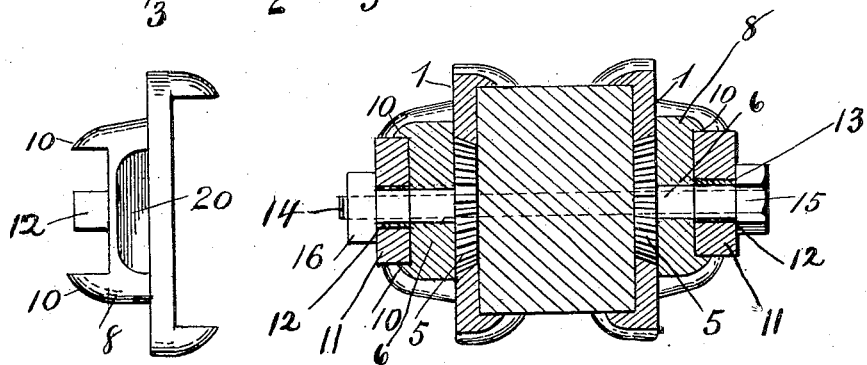
Figure 5:
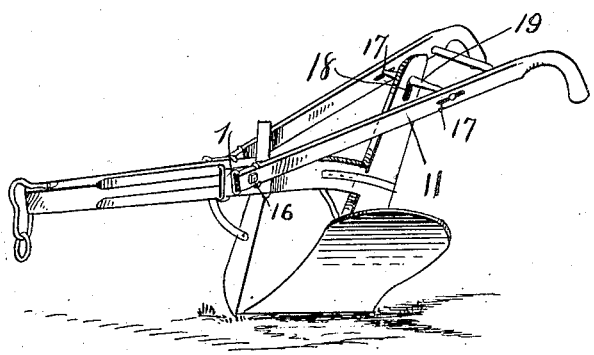

In the drawings, forming a part of this specification, and in which like symbols of reference represent corresponding parts in the several views, Figure 1 is a view of that side of the device which lies against the handles of the implement; Fig. 2, a view of the opposite side from that shown in Fig. 1; Fig. 3, an end view; Fig. 4, a cross-section of the device as it appears connected to the implement, and Fig. 5 is a view of the device as it appears attached to a plow.

The device is composed of two sections adapted to fit on each side of the implement, and as said sections correspond to each other a detailed description of one will suffice for both.

1 represents the plate or section adapted to fit the beam of the plow and being prevented from turning thereagainst by the flanges 2 and lugs 3.

4 is an internally-toothed ring connected with the piece 1, the object of the same being to receive a toothed disk 5 and lock the same in any position desired. The disk 5 has an angular shank 6 formed integral therewith and a slot 7 passing therethrough.

8 is a plate formed with flanges 9 and lugs 10, adapted to embrace the handles of the cultivator or plow 11; and 12 is a square perforated lug projecting from said plate 8, the perforation in the same corresponding with that in plate 1.

13 is a square hole in the handles 11, adapted to receive the lug 12.

14 is a bolt passing through a hole in the beam through both the plates and the handles of the cultivator and having a head 15 and nut 16 to secure the same.

20 is a recess in plate 8 for hands of operator.

17 is a slot in the handles, and 18 slot in standard for the adjustment of the cross-piece 19 in same, the set-screws holding device in position. This latter connection may be dispensed with, if desired.

The operation of the device is as follows: The handles are raised to the height desired, the disk 5 is inserted in the ring 4, the bolt passed through the various parts, and the nut turned upon the same, securely fastening the various portions together. The plates are of metal, and, if desired, the toothed ring 4 may simply be formed in the metal; but I preferably make it of hard metal and insert it in the same, as shown, as it is more advantageous so to do.

Having now fully described my invention, what I claim as new, and desire to secure by Letters Patent, is—

1. In an adjusting device for sweep-stocks and the like, a plate adapted to grasp the beam of the same, said plate provided with an internally-toothed hole, a toothed disk adapted to operate in the plate-hole, and a shank formed on the disk, said shank adapted to connect the handles of the sweep-stock.

2. In an adjuster for the handles of plows and the like, the combination with plates for grasping the beam, said plates formed with toothed perforations, a disk formed with a toothed edge and a lug projecting from same, said disk and lug having a perforation therethrough, and a bolt adapted to pass through the perforations and through the handles and beam of the plow to connect the same.

3. In an adjuster for the handles of plows and the like, the combination with the plates for grasping the beam of the same, said plates formed with toothed openings, plates for grasping the handles of the plow, said plates formed with an angular hole, a disk formed with a lug and having teeth upon its periphery, said lug adapted to fit the handle-plate holes and the toothed ring engaging the perforation in the beam-plates, perforations in the handles of the plow and the beam of the same, a bolt passing through the various holes so as to connect the various parts of the implement, and adjusting means for the standard of the plow.

In testimony whereof I affix my signature in presence of two witnesses.

THEODORE HOERHOLD.

Witnesses:
    J. W. PERRY,
    W. S. BEASLEY.